Figure 1:
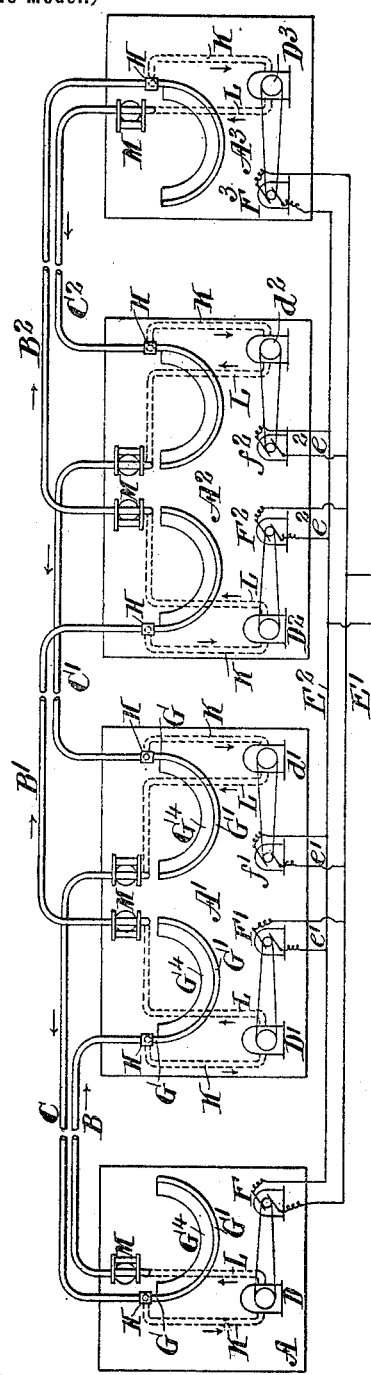

No. 706,291. Patented Aug. 5, 1902.
B. C. BATCHELLER.
SYSTEM AND APPARATUS FOR TRANSMITTING CARRIERS IN PNEUMATIC DESPATCH TUBES.
(Application filed Nov. 3, 1899.)
(No Model.) 4 Sheets—Sheet 1.

Witnesses:

Inventor:

No. 706,291. Patented Aug. 5, 1902.
B. C. BATCHELLER.
SYSTEM AND APPARATUS FOR TRANSMITTING CARRIERS IN PNEUMATIC DESPATCH TUBES.
(Application filed Nov. 3, 1899.)
(No Model.) 4 Sheets—Sheet 2.
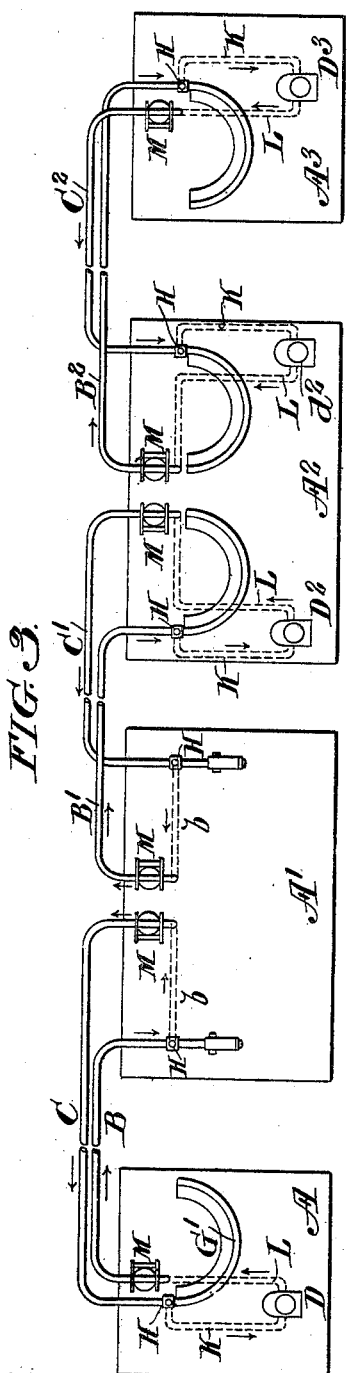
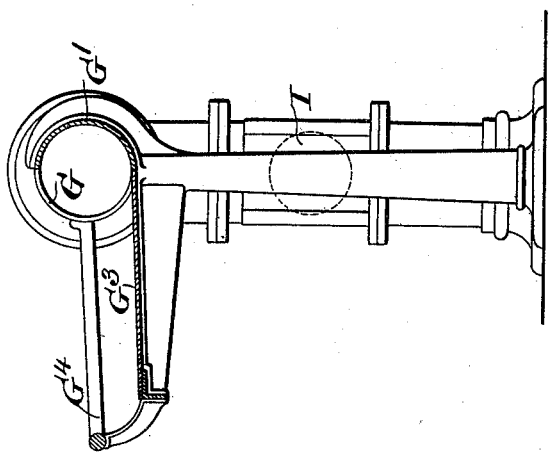
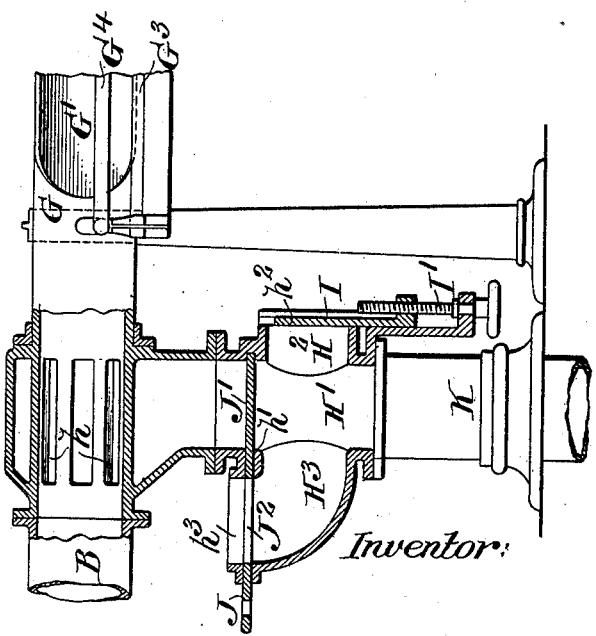

No. 706,291. Patented Aug. 5, 1902.
B. C. BATCHELLER.
SYSTEM AND APPARATUS FOR TRANSMITTING CARRIERS IN PNEUMATIC DESPATCH TUBES.
(Application filed Nov. 3, 1899.)
(No Model.) 4 Sheets—Sheet 3.
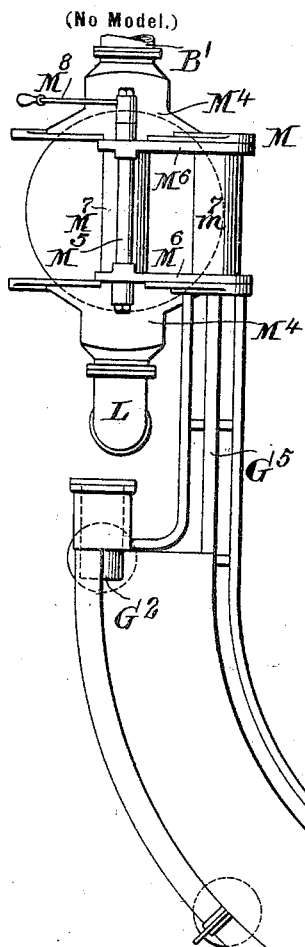
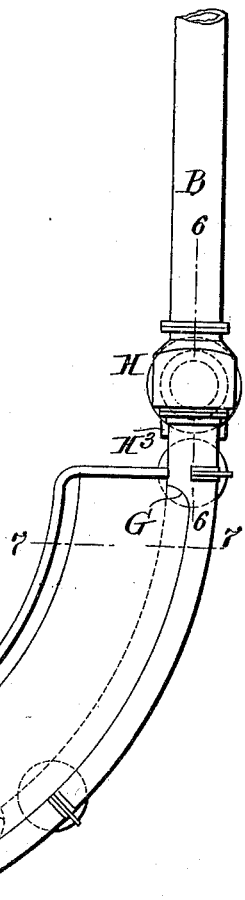
FIG. 4.
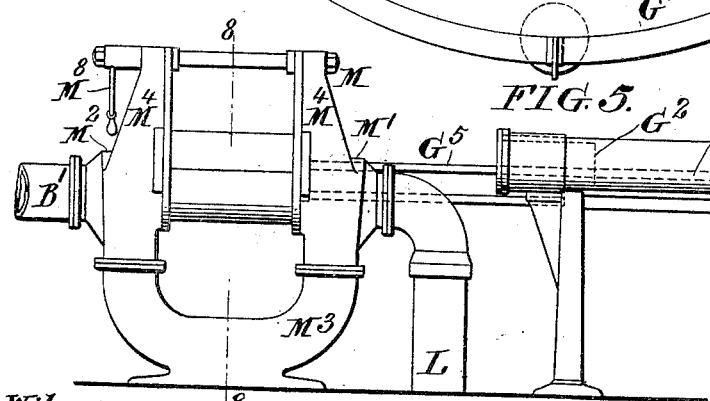
FIG. 5.
Witnesses:
Inventor:
Birney C. Batcheller
by his atty.

No. 706,291. Patented Aug. 5, 1902.
B. C. BATCHELLER.
SYSTEM AND APPARATUS FOR TRANSMITTING CARRIERS IN PNEUMATIC DESPATCH TUBES.
(Application filed Nov. 3, 1899.)
(No Model.) 4 Sheets—Sheet 4.
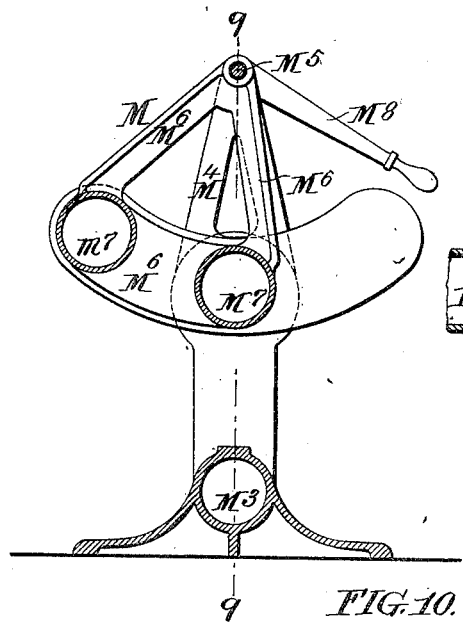
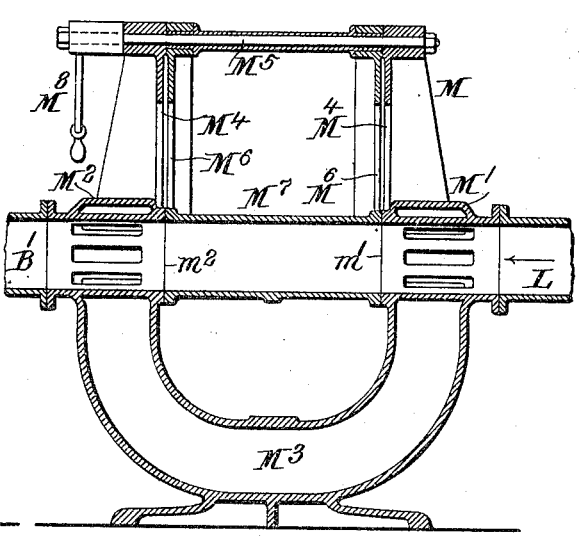
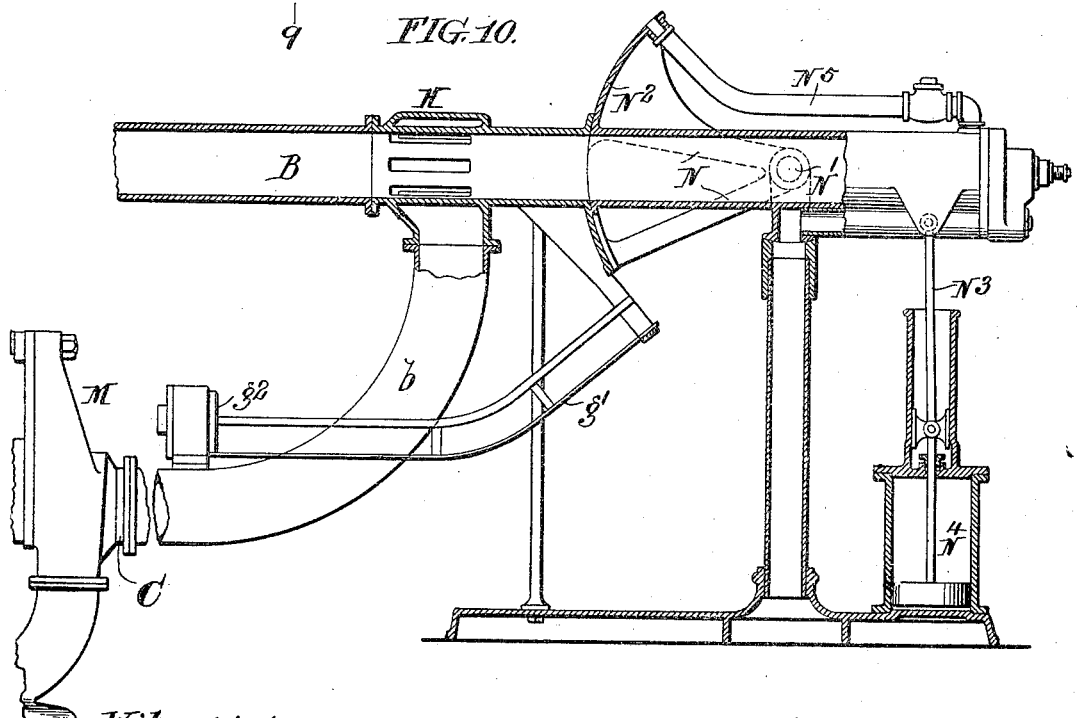

UNITED STATES PATENT OFFICE.

BIRNEY C. BATCHELLER, OF PHILADELPHIA, PENNSYLVANIA.

SYSTEM AND APPARATUS FOR TRANSMITTING CARRIERS IN PNEUMATIC-DESPATCH TUBES.

SPECIFICATION forming part of Letters Patent No. 706,291, dated August 5, 1902.

Application filed November 3, 1899. Serial No. 735,652. (No model.)

*To all whom it may concern:*

Be it known that I, BIRNEY C. BATCHELLER, a citizen of the United States of America, residing in the city and county of Philadelphia, in the State of Pennsylvania, have invented a new and Improved System and Apparatus for Transmitting Carriers in Pneumatic-Despatch Tubes, (for which I have obtained Spanish Letters Patent, No. 24,520, application filed July 20, 1899, and filed patent applications in Great Britain, France, Germany, Belgium, Austria, Hungary, Italy, Portugal, Sweden, Russia, Turkey, India, Japan, New South Wales, Victoria, Canada, Mexico, Argentine Republic, and Brazil on the 20th of July, 1899,) of which the following is a true and exact description, reference being had to the accompanying drawings, which form a part thereof.

My invention relates to an improved system of transmitting carriers in pneumatic-despatch tubes and to certain improvements in details of apparatus used in the system, having for its object the provision of a system which may be worked to a high degree of efficiency at comparatively moderate cost and with great simplicity of apparatus.

My invention is based upon and in part embodies the subject-matter of my Patent No. 632,690, dated September 12, 1899, in accordance with which two stations are connected by a transmission tube or tubes having its receiving end connected to a source of air under pressure and its delivery end open to the atmosphere and also connected a short distance to the rear of its end with the suction-pipe or blast-fan of an air-compressor.

My present invention, broadly speaking, consists in coupling a multiple series of stations by means of tubes having the characteristics described in my said former patent, all the stations of the multiple series being coupled in pairs and so that all the carriers passing through the system are delivered at each station and those destined for a further station delivered again to the receiving device of the tubes connecting the next pair of stations. In this multiple series of stations, coupled as aforesaid, I may connect two air-pumps or similar devices with the transmission-tubes in such manner that the air is drawn from the transmission-tube leading into a station and forced into the transmission-tube leading to the next station in consecutive order, and so on, so that the same body of air traverses the entire multiple series of stations. Preferably, however, I connect the pumps so as to draw the air from a transmission-tube leading to the station and force it into a transmission-tube leading to the same station from which the first transmission-tube leads, so that the circulating system for each connected pair of stations is entirely separate and independent from the transmission systems coupling the other stations, the particular advantage of this construction being that in case of stoppage or breakdown in the system coupling any two stations the operation of the other couples will not be interfered with and all may remain in full operation.

Another important feature of my invention, which involves the use of a considerable number of independent pumps or blowers situated in different stations of the line, consists in operating such pumps or blowers by a series of independent electric motors and supplying current to all such motors through circuits connected with a common electric generator.

Other features and modifications of my invention will be best understood as described in connection with the drawings in which my invention is illustrated, and in which—

Figure 2:
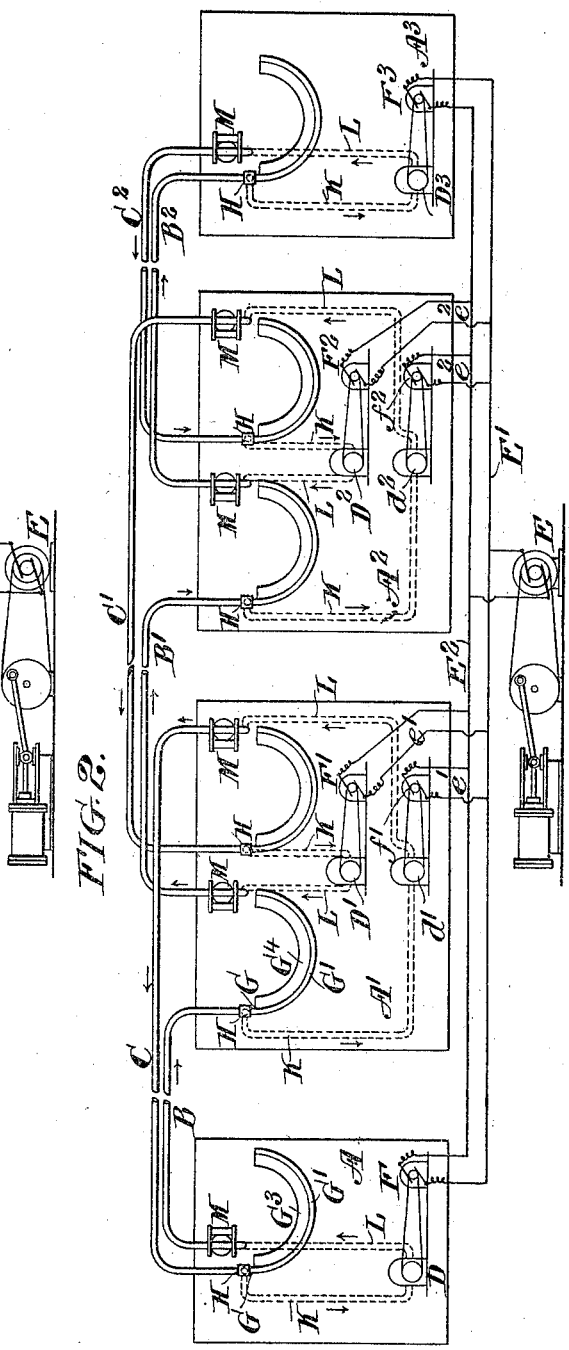

Figure 1 is a diagrammatic view illustrating my invention as applied to a multiple series of stations. Fig. 2 is a similar diagrammatic view illustrating another and my preferred modification of the application of my system to a multiple series of stations. Fig. 3 illustrates another modification of my invention applied to a multiple series of stations. Fig. 4 is a plan view showing the delivery end of one tube, the receiving end of the other tube, the transmitter used in connection with the receiving end of the tube, and the receiving-table used in connection with the delivery end of the tube and having, as shown, a chute connection with the transmitting device. Fig. 5 is a side elevation of the transmitter and the end of the receiving-table as shown in Fig. 4. Fig. 6 is a sectional elevation taken on the line 6 6 of Fig. 4. Fig. 7 is a cross-sectional elevation taken on the line 7 7 of Fig. 4. Fig. 8 is a cross-sectional elevation taken on the line 8 8 of Fig. 5. Fig. 9 is a longitudinal sectional elevation taken on the line 9 9 of Fig. 8, and Fig. 10 is a sectional elevation of a closed receiving device used in connection with one modification of my invention.

A, A', A², and A³, Figs. 1, 2, and 3, indicate separate stations of the system on the line.

B, B', and B² are outgoing transmission-tubes coupling the stations in pairs from the end station A to the end station A³.

C, C', and C² are incoming transmission-tubes coupling the stations in pairs and leading from the station A³ to the station A.

D, D', d', D², d², and D³ indicate air compressors or blowers situated in the separate stations and each, as shown, driven by an electric motor, such motors being indicated at F, F', f', F², and F³.

E indicates an electric generator common to the system, from which lead circuit-wires E' and E², connecting, as shown, directly with the motors F and F³ in the terminal stations and through branch wires (indicated at e' e' and e² e²) with the motors in the intermediate stations A' and A².

G (see particularly Figs. 4 and 6) indicates the open delivery end of the transmission-tube, the tube being preferably cut away for half or slightly more than half of its diameter at this point and the substantially semicircular section continued in a curve, as indicated at G', said curved section terminating, preferably, with a buffer, as indicated at G². It will be understood, however, that the full section of the tube may be continued for any desired distance on the curve. Thus in Fig. 4 I have indicated in dotted lines the continuance of the full section of the tube to the point marked g.

G³ indicates a receiving-table extending inward from the bottom of the curved section of the pipe G', as best shown in Figs. 4 and 7, the table being slightly inclined and provided with a rail, as indicated at G⁴, for preventing the carriers from rolling off.

G⁵ indicates a chute extending from the end of the inclined receiving-table to the transmitting device to be hereinafter described.

It will be understood that the carriers issuing from the pipe B will have their momentum greatly checked in passing around the curved section G' and that if the momentum is sufficient to carry them entirely around this section they will be stopped by the buffer G² and that in all cases the carriers as soon as their propulsive momentum is lost will roll forward or inward on the table G³ until they rest against the rail G⁴, from which position they can be removed or thrust into the chute G⁵.

H indicates an annular head surrounding the transmission-pipe B at a point near its open delivery end G, the pipe B within the head being slotted, as indicated at h, to permit the free passage of air. As shown, the head H connects directly with a union casting H' and through it with the pipe K, the casting H' having also, as shown, lateral extensions (indicated at H²) having an open end h² and also at H³ having an open end h³.

I indicates a regulating gate or valve adjusted by a screw I' and fitting on the open end of the passage H². By adjusting this gate provision may be made for the introduction of any desired amount of air through the passage H².

J is a sliding plate having a portion J', which in the position shown in Fig. 6 closes the passage from the head H through the casting H'. The plate has also an opening J², which in the position shown registers with the opening through the passage H³, permitting the passage of air freely through said passage and the casting H' to the pipe K. In normal operation the plate J is drawn out, so as to open freely the passage between the head H and the casting H', in which position its solid portion J' closes the passage H³.

K is the suction pipe or conduit of an air pump or blower, such as is indicated at D D', &c.

L is the delivery-pipe of the compressor or blower, which leads, as shown, to the receiving end of one of the transmission-tubes.

M is what I may call a "transmitter"—that is to say, a device for facilitating the introduction of carriers into the receiving ends of the tubes. Any convenient device for this purpose, of which many are well known, may be used. The one I have illustrated is best shown in Figs. 8 and 9. A portion of the receiving end of the tube, such as is indicated at B', is cut away. The adjacent ends are surrounded by annular boxes, as indicated at M' and M², m' and m² indicating the adjacent opposite ends of the severed tube. The tube within the boxes is slotted and the sections connected by a curved passage, as indicated at M³. M⁴ M⁴ indicate standards supported on the box M' and M² and supporting at top a shaft M⁵, to which in turn is secured a swinging bracket M⁶, formed with face-plates, as indicated, which close the tube ends m' m², except where the transverse tubes M⁷ and m⁷ are secured to said face-plates, said tube-sections being adapted to register with the tube ends as the bracket is swung from one position to the other, which may be conveniently accomplished by the lever-arm M⁸. The carrier is introduced to the transmission-tube by inserting it, for instance, in the tube-section m⁷ and then swinging the bracket until said tube-section registers with the tube ends m' m², when the blast of air will sweep the carrier out of the transmitter into the transmission-tube.

It will be understood that in the operation of my system air is forced into the receiving ends of the tubes by a blower or compressor and that a blower or compressor of similar capacity and speed is used to draw the air from the delivery end of the tubes, so that the pressure in the tube is at its maximum at the receiving end, gradually and uniformly falling to atmospheric pressure at its delivery end, and it will also be understood that there is or need be practically no movement of air in the delivery-tube beyond the point at which the suction end of the compressor is connected, so that the carrier after passing this connection is carried forward merely by its momentum, which is conveniently taken up on the curved receiving-section. Some air is almost inevitably lost from the tube by leakage between its receiving and delivery ends, and therefore there is a tendency toward an actual inflow of air from the open end G of the tube to the box H. This may be availed of, if desired, as a means for checking the momentum of the carrier, and it may be modified or entirely obviated by providing for an independent inflow of air into the suction-tube K through an opening other than the open end of the tube. Thus the gated opening H² may be used for this purpose, or by adjusting the slide-plate J the opening H³ will serve the same purpose as well as the purpose for which it is expressly provided—namely, as an opening through which the compressor may draw its entire supply of air at such times as the transmission-tube used in connection with it is out of service or at such times as it is desired to cut off the connection between this transmission-tube and the suction-pipe, so as to raise the pressure in the transmission-tube in order to force a carrier out which has become lodged in the pipe or for any other purpose.

Referring now to the diagrams, it will be noticed that in the connections indicated in Fig. 1 the air passes from the blower D into the transmission-tube B, thence through the blower D' into the transmission-tube B', and so on, the air passing from station to station and returning to the blower D in station A only after it has made the entire circuit of the system. In Fig. 2, however, I have indicated a system of connection which I prefer, the air passing from the blower D to the transmission-pipe B, thence to and from the blower $d'$ to the return-pipe C, and from its delivery end back to the blower D. Each of the other stations coupled in pairs forms, like the one described, a complete and independent circuit, so that in case of obstruction impairing the service between any two stations the stations on each side of it are still maintained in full operation, although the system as a whole may be temporarily broken.

In the diagrams Fig. 3 I have illustrated a modification of my invention, in which the intermediate station A' is provided with no blowing or compressing apparatus, but reliance had for the connections between A and A' and between A' and A² entirely upon the compressors D and D². This is accomplished by the use of a device such as is indicated in Fig. 10, the transmission-tube B, for instance, terminating in a closed receiver, (indicated at N,) this receiver being pivoted at N'. As shown, it is actuated through a connecting-rod N³ by a piston moving in the cylinder N⁴, the upward stroke of the piston bringing the end of the receiver into registry with the receiving-chute $g'$ and its return stroke bringing the parts to the position shown in Fig. 10, N⁵ indicating an escape-pipe for air forced into the receiver in front of a carrier. A short distance in front of the receiver the pipe B is connected by a box H and a pipe $b$ with the receiving end of a return-tube C. $g'$ indicates a receiving-chute into which the carrier is dumped from the receiver N, $g^2$ indicating a stop or buffer at the end of the chute. In the use of this style of closed receiver the actuating-cylinder N⁴ or other actuating device is arranged, by means which are well known to be set in operation by the entry of a carrier, so as to dump the carrier into the chute $g'$ and return the receiver to position to receive another. In this construction the tubes B and C are from the point of view of my invention to be considered as practically one tube, the pressure being at the maximum at the receiving end of tube B, falling gradually to atmospheric pressure at the delivery end of tube C. This modification may be useful under certain conditions, although it is obviously not capable of use to the same extent as the preferred form of my invention, in which no delivery of the carrier is effected except at the open delivery end.

Of course it will be understood that all the different plans of connection between stations which I have indicated and described may be used in a single system. Thus, for instance, in Fig. 3 I have shown the stations A² A³ connected as in diagram Fig. 2.

Having now described my invention, what I claim as new, and desire to secure by Letters Patent, is—

1. A pneumatic transmission system comprising three or more stations, each connected to the adjacent station by an outgoing and incoming transmission-tube, said tubes having their receiving ends in each station connected to the delivery-conduit of an air-compressor situated at or near each station and their delivery ends in each station open to the atmosphere, an air-conduit in each station leading from a point in the transmission-tubes near their open delivery ends to the suction-conduits to the air-compressors aforesaid, all substantially as described, and so as to maintain one body of air in circulation between each two adjacent stations.

2. A pneumatic transmission system comprising a series of stations, outgoing and incoming transmission-tubes connecting said stations in pairs, air-compressors situated in separate stations of the series connected to force air into the receiving ends of the tubes and draw air from them at points adjacent to their delivery ends, electric motors in the separate stations connected to drive the compressors, an electric generator common to the system and circuit connections leading therefrom to the motors aforesaid.

3. In a pneumatic transmission system comprising three or more stations connected in pairs by outgoing and incoming transmission-tubes, said tubes being connected at their receiving ends to sources of air under pressure and open to the atmosphere at their delivery ends, and air-pumps having their suction-conduits connected to the delivery ends of the transmission-tubes a short distance from their open ends, the combination with a transmitter situated in the receiving end of a transmission-tube at one station of a curved delivery-table, as $G'$ $G^3$, connected with the delivery end of a transmission-tube leading to the station and a chute as $G^5$, leading from said table to the transmitter.

BIRNEY C. BATCHELLER.

Witnesses:
CHAS. F. MYERS,
D. STEWART.